United States Patent [19]

Sabacky et al.

[11] Patent Number: 4,551,313
[45] Date of Patent: * Nov. 5, 1985

[54] FLASH SUBLIMATION AND PURIFICATION OF MOLYBDENUM OXIDE

[75] Inventors: Bruce J. Sabacky, Westminster; Malcolm T. Hepworth, Golden, both of Colo.

[73] Assignee: Amax Inc., Greenwich, Conn.

[*] Notice: The portion of the term of this patent subsequent to Nov. 26, 2002 has been disclaimed.

[21] Appl. No.: 583,566

[22] Filed: Feb. 27, 1984

[51] Int. Cl.⁴ .............................................. C01G 39/02
[52] U.S. Cl. ......................................... 423/59; 423/53
[58] Field of Search .................................. 423/59, 606

[56] References Cited

U.S. PATENT DOCUMENTS 1,426,602  8/1922  Robertson ............................. 423/59
3,139,326  6/1964  Costello ............................... 423/59
3,848,050 11/1974  Jamal .................................. 423/59

Primary Examiner—H. T. Carter
Attorney, Agent, or Firm—Michael A. Ciomek; Eugene J. Kalil

[57] ABSTRACT

A process and system are provided for flash-sublimation of molybdic oxide containing slag-forming constituents. The process comprises feeding a pneumatically suspended stream of particulate molybdic oxide and a mixture of fuel and oxidizing gases through a nozzle into a confined furnace chamber, the fuel gas-oxidizing gas mixture exiting from the nozzle being ignited to provide a flame thereof, the flame being maintained at a condition to provide a temperature in the furnace chamber in excess of that required to sublime molybdic oxide. The temperature is preferably at least sufficient to melt slag-forming constituents contained in said molybdic oxide such that the slag formed is sufficiently liquid to separate from the gaseous mixture and collect at a selected portion of the chamber for removal therefrom. The resulting gases and suspended solids including sublimed molybdenum trioxide are caused to flow from said furnace chamber to and through a condensing chamber, the temperature of the condensing chamber being controlled to above the condensing temperature of the sublimed molybdenum trioxide but below the volatilization temperature of the impurities present and thereby effect a separation of the molybdenum trioxide from the impurities. The separated molybdenum trioxide vapors are then passed to a condenser to condense and recover the molybdenum trioxide as solids and separate it from off-gases.

6 Claims, 6 Drawing Figures

FLASH SUBLIMATION AND PURIFICATION OF MOLYBDENUM OXIDE

This invention relates to a process for purifying technical grade molybdenum trioxide containing slag-forming impurities and, in particular, to a flash sublimation process for the purification of such molybdenum oxides.

FIELD OF THE INVENTION

It is known that substantially pure molybdenum trioxide can be produced from technical-grade oxide by sublimation. For example, in present technology, technical-grade oxide feed is conveyed to a slowly rotating sandbed supported upon a hearth plate. Inducted air is caused to move at a high flow rate over the bed past the heaters to a collection hood which also serves to condense the product, which is thereafter separated by a downstream gas/solids system. Although the process produces a high-purity product, it has two drawbacks. First, the recovery of molybdenum is significantly less than 75 percent, resulting in a downgrade product. Second, by virtue of the large air flow, most of the heat is used to elevate the temperature of the inducted air rather than to sublime the product.

It would be desirable to provide a sublimation process that avoids the foregoing problem and in which sublimation and purification can be achieved in a flash furnace, using fuel gas, e.g., natural gas, as a source of heat rather than the more costly electric power.

OBJECTS OF THE INVENTION

It is an object of the invention to provide a process for the flash sublimation of molybdenum trioxide and for the purification thereof.

Another object is to provide a high temperature process for the flash sublimation of technical grade molybdic oxide containing slag-forming constituents, wherein the slag-forming constituents are selectively removed to provide an upgraded product of molybdenum trioxide.

These and other objectives will appear more clearly when taken in conjunction with the following disclosure, the appended claims and the accompanying drawings, wherein:

SUMMARY OF THE INVENTION

Figure 1:
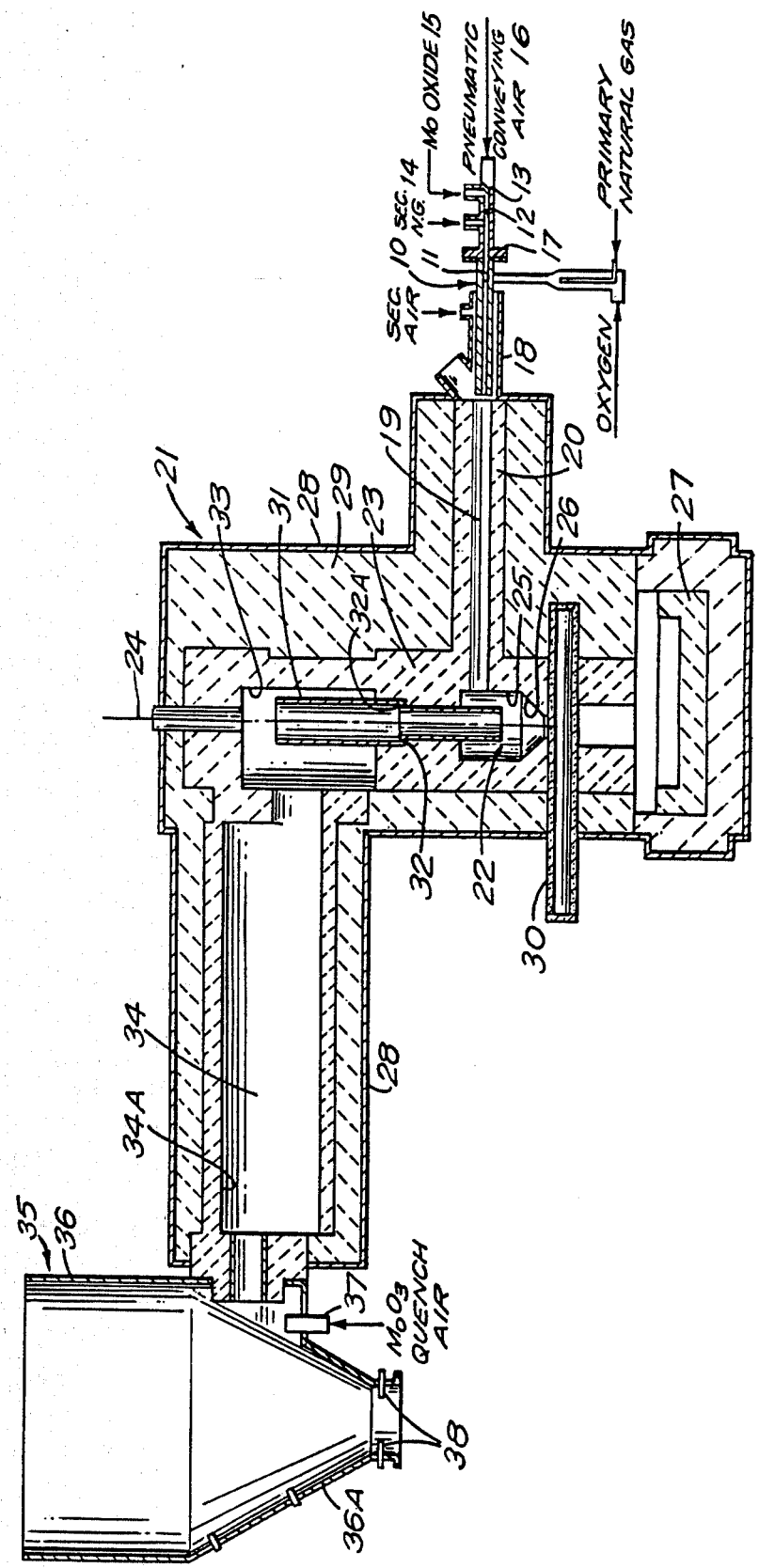
FIG. 1 is a view in elevation showing schematically in cross section one embodiment of a cyclone furnace which may be used in carrying out the invention.

According to one embodiment of the invention, a free-flowing technical-grade molybdic oxide feed containing such impurities as silica, alkali and heavy metals is inducted pneumatically into a tube contained in a natural gas/air or air plus oxygen burner which produces an envelope of hot gases (T≧1600° C., e.g., about 1600° C. to 1800° C.) around the fluidized pneumatic feed stream. The hot gases and feed are then passed into a ceramic-lined tube which serves to provide the retention time necessary for the transfer of heat to the solids and to reflect the heat from the tube walls. The partially vaporized solids are then inducted into the furnace chamber, e.g., into a ceramic cyclone, where the process of sublimation is completed to the extent of approximately 95 to 99 percent of the molybdenum entering the vapor phase. The silica and clay components, which comprise the bulk of the impurities, along with other refractory oxides, are collected as an ash or a slag. In the case of the cyclone furnace, the stream is centrifugally spun to the walls of the furnace where the impurities are collected. Operation at a sufficiently high temperature is desirable in order to provide a sufficiently fluid slag so that it will flow by gravity to a slag pot positioned below the cyclone (e.g., T≧1600° C., such as 1700° C. and above). The slag can be removed continuously or intermittently. The treatment in the furnace chamber represents the first stage of purification, that is, the separation of volatile molybdic oxide from non-volatile refractory components. However, certain heavy metals, notably the oxides of lead, zinc, bismuth, arsenic, etc. form volatile molybdates which are swept downstream at the high temperatures.

A problem with the use of a cyclone furnace is that the erosion of the refractory lining of the furnace chamber occurs over a period of time due to the centrifugal action of the hot stream in depositing fluid slag on the furnace lining.

A preferred embodiment for minimizing erosion is to employ a vertically disposed furnace with a hearth at one end in which a slag pool is formed and against which the stream is directed while avoiding as much as possible contact of the hot stream with the refractory lining of the furnace. The slag-forming impurities enter the slag and are captured; thereby, the volatile material, including the off-gases, being passed on to a condenser.

The second stage of purification for removal of the heavy metals is accomplished by cooling the vapors in a ceramic passage (a secondary condenser) to a temperature range of 850° to 950° C., well above the sublimation temperature of molybdic oxide at the normal gas concentration used, but significantly below the temperatures at which the heavy metal molybdates exert a high vapor pressure. Temperature in the secondary condenser can be controlled by introduction of cooling air and water sprays, or by heat exchange to reduce the temperature from the upstream combustion cyclone. The secondary condenser can be constructed of a series of ceramic bricks overlaid to provide a tortuous path and a large condensation surface. A packing of ceramic rings or saddles may also be used. Periodically, when all condensation surfaces are occupied and the backpressure increases, then a second parallel system can be operated while the first is purged to a separate smaller collection system. The purging is accomplished by heating to temperatures above the vaporization temperature of the heavy metal oxides or by mechanical cleaning.

The purified molybdic oxide vapors are then condensed in a primary product condenser at a temperature ranging from about 150° C. to 500° C., e.g., about 200° C. to 500° C. Tests have shown that the addition of water sprays and inducted air can accomplish the condensation with minimum equipment size. The product so collected can then be removed in the usual fashion with cyclones, precipitators, baghouse, or a combination of these. The product condenser may be included as part of the baghouse.

DETAILS OF THE INVENTION

The molybdic oxide to be thermally treated generally has a fine particle size (minus 48 mesh, U.S. Standard), although coarser material is also amenable to flash volatization. The molybdic oxide may be fed by means of a sealed conveying device to a preheater if it contains moisture. The combustion air and free-flowing oxide feed are educted into a burner assembly constructed to produce turbulent mixing. Preheating of the air to a temperature of about 600° C. may be employed but is not necessary.

Figure 2:
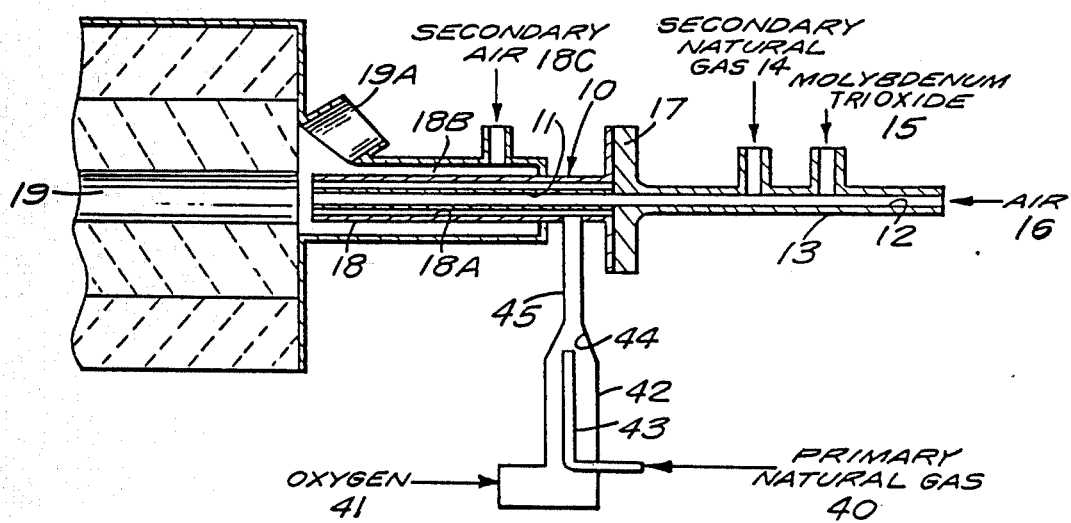
FIG. 2 is an enlarged portion of the feed end of FIG. 1 showing the relationship of the molybdenum oxide feed and the feeding of the various gases relative to the torch assembly coupled to the cyclone furnace.

As illustrative of one embodiment of the invention, reference is made to FIGS. 1 and 2, the same numerals being used for the corresponding elements. A burner assembly 10 is depicted having a channel 11 passing centrally therethrough which is coextensive and coaxial with a channel 12 of the feed end portion 13 of the assembly, the feed end portion 13 having inlets or ports 14, 15 for receiving secondary natural gas and particulate molybdic oxide, respectively. Air is fed to end 16 of feed channel 12 to pneumatically suspend the particulate oxide and to mix with the secondary natural gas entering port 14. The term "secondary" is used to indicate that this is not the main gas supply, but rather is auxiliary with the main or primary supply.

The feed portion 13 is flange-connected (17) to the burner assembly 10, the torch end portion 18 of which extends to the mouth of combustion and vaporization chamber 19. The vaporization chamber comprises a tubular or shell lining 20 of high temperature refractory, e.g., alumina or zirconia, said chamber being a part of the cyclone furnace assembly 21 and being in communication with the cyclone furnace 22 which is encompassed within walls of high temperature refractory 23, e.g., alumina, or zirconia, etc.

The cyclone furnace is disposed vertically along its longitudinal axis 24 and comprises a substantially cylindrical chamber 25 having a conically configurated bottom 26 with a central opening through which liquid slag formed during the reaction flows into receptacle 27 at the bottom of the cyclone furnace assembly, the assembly being encased in an outer steel shell 28 having within it an insulation comprising a ceramic blanket or other similar fibrous ceramic 29, the insulation extending throughout the furnace assembly.

A globar heating unit 30 of silicon carbide comprising several rods of silicon carbide electrically heated may be employed to assure fluidity of the slag formed at the walls of the furnace so that it will flow by gravity to the bottom of the cyclone chamber.

A tube of alumina or zirconia 31, or other suitable refractory, is located along the longitudinal axis of the cyclone furnace, the tube being stepped at 32 to provide an annular shoulder which is supported by a corresponding annular shoulder on a reduced portion 32A of the cyclone furnace extending upwardly from cyclone chamber 25. Thus, the tube provides a passageway through which gaseous products, including molybdenum trioxide, are drawn by a downstream fan located at the baghouse, the gaseous products being drawn into the upper furnace chamber 33 and thence through an alumina- or zirconialined (34A) chamber 34 containing a ceramic packing of either rings or saddles, the temperature of the chamber being maintained above the volatilization temperature of molybdenum trioxide and below the volatilization of the metal oxides and molybdates, thereby to condense said metal oxides and metal molybdates, and separate them from the molybdenum trioxide vapor.

Chamber 34 (referred to as the partial condensing chamber) may comprise two separably operable chambers in parallel so that when one is in use, the other is being cleaned to get it ready for the next cycle in place of the first one. The alumina or zirconia liner as shown is surrounded by a ceramic packing enclosed within the continuation of the outer steel shell 38.

Chamber 34 extends horizontally to and communicates with baghouse 35 (lower fragment shown only) comprising an outer shell 36 and a conically configurated bottom 36A into which air is blown via nozzle 37 to quench molybdenum trioxide vapors entering the baghouse and effect the condensation thereof.

The condensed purified trioxide is collected at the bottom which is closed and discharged at various periods through nozzles 38. Off-gases are drawn upwardly through the baghouse via a draft fan not shown.

Referring to FIG. 2, the manner in which the particulate molybdic oxide is fed will be apparent from the following description.

Air is fed into the end 16 of the feed end portion 13 of the assembly to suspend pneumatically particulate molybdic oxide entering port 15, secondary natural gas, if desired, being fed via port 14. The suspension is fed through channel 12 which is contiguous with burner channel 11. The suspension thus enters burner channel 11 and enters the mouth of combustion and vaporization channel 19 after being emitted from nozzle 18 of burner assembly 10.

In the meantime, primary natural gas 40 and oxygen 41 are fed to mixing chamber 42, the natural gas being fed via nozzle 43 within the chamber, with oxygen flowing over and around the nozzle to provide mixing at the conical end portion 44 of mixing chamber 42. The mixed gases flow via tube connection 45 coupled to the burner assembly into annular chamber 18A which surrounds channel 11. The mixture of oxygen and natural gas pass along annular chamber 18A and to the nozzle at the end thereof where the gases are ignited to provide an annular flame surrounding the pneumatically suspended stream of particulate molybdic oxide emitted from the nozzle at the mouth of combustion chamber 19. The heat of the flame raises the temperature of the oxide to effect conversion of the molybdic oxide to volatile molybdenum trioxide. Additional oxygen may be added to assure that the desired end product is produced.

This is shown clearly in FIG. 2 which depicts an annular chamber 18B surrounding burner assembly 10 and closed at one end and opening at its other end into the mouth of combustion channel 19, a burner view port 19A being provided to observe the flame and the suspended powder entering combustion channel 19. Secondary air is added via port 18C which flows through annular chamber 18B into combustion channel 19 to provide additional oxidation, if necessary.

As will be clearly apparent, the invention also provides a system for converting metal compounds into a volatilized state for the subsequent purification thereof or for the oxidation thereof to a volatile reaction product.

Thus, another embodiment of the invention is directed to a system for the flash vaporization at elevated temperatures of a particulate metal compound containing impurities to produce a substantially purified product therefrom, the system comprising, a furnace having a confined chamber therein, with inlet and outlet means, means for feeding a pneumatic suspension of a metal compound into the chamber, including means for concurrently feeding a mixture of fuel and oxidizing gases thereto, means for maintaining a flame in the confined chamber following ignition of the fuel gas and for providing a volatilized reaction product produced from the metal compound including off-gases formed in said chamber. The system also includes a condensing means coupled to the outlet of the furnace for selectively condensing impurities while maintaining the reaction product volatile, and a second condensing means coupled to the first condensing means for receiving the separated volatile reaction product including off-gases, the second condensing means being maintained at a temperature below the volatilization temperature of the reaction product, whereby the reaction product is condensed and separated from the off-gases. Baghouse means is provided for removing the off-gases from said condensed reaction product, and means for conducting the off-gases from the baghouse for the further treatment thereof where necessary.

Thus, the invention provides a process for flash-vaporization of molybdic oxide containing slag-forming constituents, the process comprising feeding a pneumatically suspended stream of particulate molybdic oxide and a mixture of fuel and oxidizing gases through a nozzle into a confined chamber of a furnace, the fuel gas-oxidizing gas mixture exiting from said nozzle being ignited to provide a flame thereof, maintaining the flame at a condition to provide a temperature in said confined chamber sufficient to sublime molybdic oxide and form a volatile gas comprising molybdenum trioxide, the temperature preferably being at least sufficient to melt the slag-forming constituents and cause the slag formed to collect in a selected portion of the furnace chamber for subsequent or concurrent removal thereof, removing the resulting gases including the volatile molybdenum trioxide from the furnace chamber through a condensing chamber, the temperature of the condensing chamber being controlled to above the condensing temperature of the volatilized molybdenum trioxide but below the volatization temperature of other metal oxides present such as to effect a separation of the molybdenum trioxide from said metal oxides, and passing the separated volatilized molybdenum trioxide to a condenser to condense and recover the trioxide and separate it from off-gases comprised of oxides of carbon.

The stoichiometry of the air/reductant ratio is not critical and can be adjusted as desired. The determination of the air/reduction ratio is conventional and is well known to those skilled in the art so long as sufficient heat is produced to melt the slag-forming constituents. Thus, the flame front emerging from the burner or multiple burner assemblies is directed into a refractory-lined cyclonic enclosure to achieve an interior temperature to cause the most refractory of the gangue constituents (silica and clays) to melt and form a free-flowing slag which can be continuously removed. A typical temperature required for the slag to be free-flowing is of the order of 1700° C., but this temperature may be higher or lower (within 100° to 200° C.), depending upon the composition of the slagging components. Heat exchange between the off-gas and furnace enclosure to the incoming air may be resorted to achieve the upper temperature range, or auxiliary fuel or oxygen enrichment may be used, if necessary.

Figure 3:
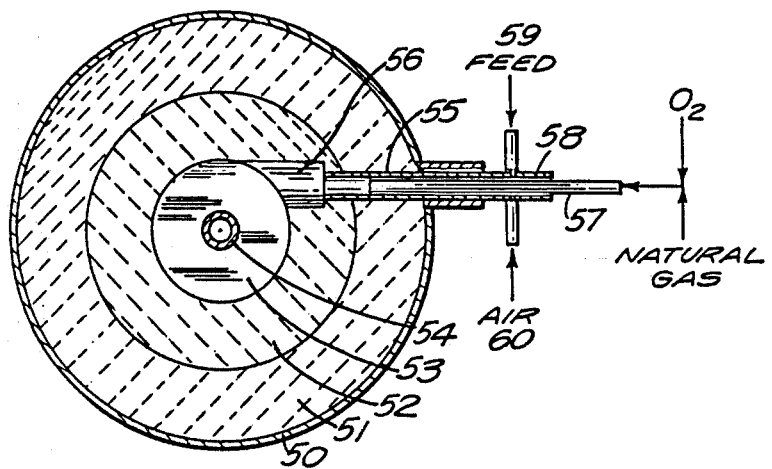
FIG. 3 is a plan view in cross section of another embodiment of a cyclone furnace for carrying out the process of the invention.

Another embodiment of a burner assembly is shown in the plan cross-sectional view of FIG. 3. The cyclone furnace which was employed on a laboratory scale comprises a cylindrical steel shell 50 (about 18 inches in diameter) surrounding a cast insulating refractory 51 which in turn surrounds a cast high temperature furnace wall 52 which defines within it a cyclone furnace cavity 53. The laboratory-sized cyclone cavity was about 6 inches in diameter, the size being substantially larger for production purposes. A vortex finder 54 of tubular alumina or zirconia is provided extending downwardly into the furnace cavity (note FIG. 4). The torch or burner 55 extends through the furnace walls and is disposed tangentially to the cavity as shown, the torch being coaxially coupled to a two-inch diameter cyclone entrance 56. The torch body 57 extends coaxially rearward of the torch and is of tubular construction for receiving oxygen or air and fuel gas (e.g., natural gas) which is fed mixed to the torch head or nozzle.

The torch body passes substantially concentrically through a tubular member 58 through which pneumatically-conveyed feed 59 (i.e., molybdic oxide) is fed along with air 60. The torch and feed assembly is so arranged relative to the cyclone cavity as to provide a spinning action to the particulate solids and gas mixture about vortex finder 54 and adjacent the cylindrical walls of the furnace.

Figure 4:
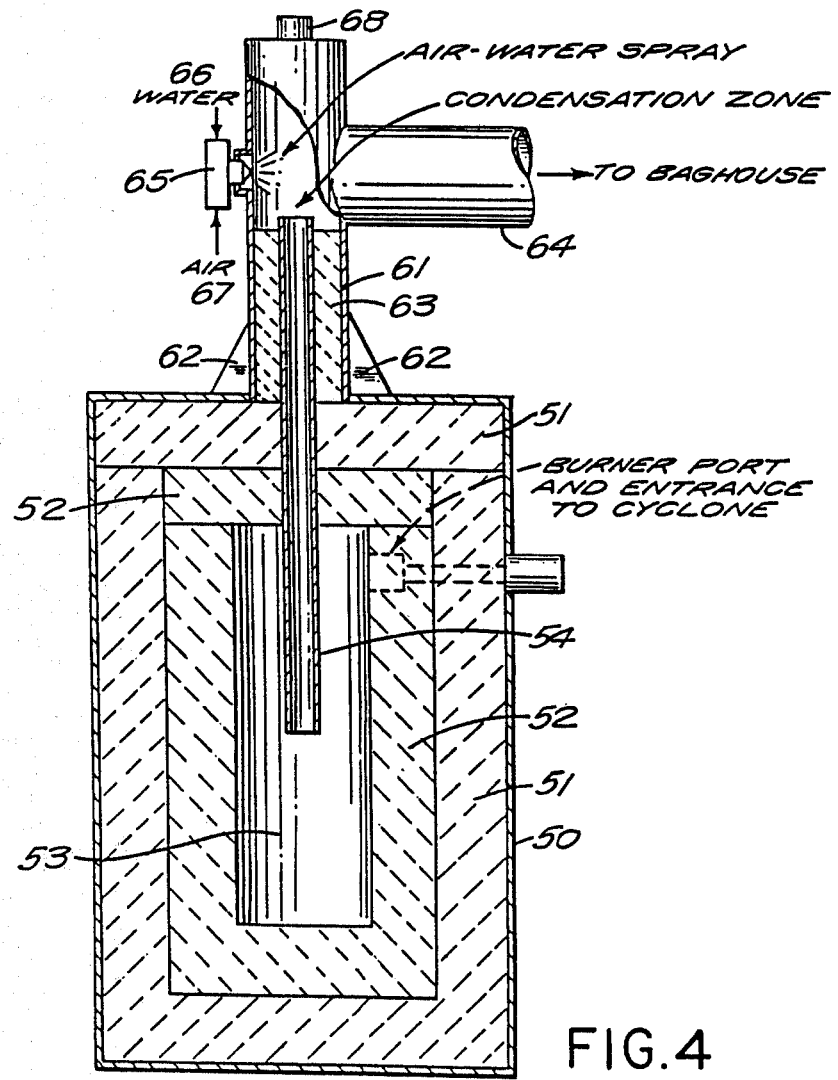
FIG. 4 is a cross section in elevation of a cyclone furnace of the type shown in FIG. 3.

FIG. 4 is a vertical cross section of the cyclone furnace in which the same numerals are used for the same parts as described for FIG. 3. As will be noted, the vortex finder 54 extends downwardly about one-half of the depth of cavity 53. A stainless steel pipe 61 is coupled to the top of the furnace via structural webs 62, the pipe surrounding insulation 63 in the form of a ceramic blanket. The pipe is contiguous with a horizontally disposed condenser 64 through which the reacted products flow and in which condensation occurs, except for the volatile molybdenum trioxide. To aid in selectively condensing certain of the metal oxides, a water-atomizing nozzle 65 may be employed, a mixture of water 66 and air 67 being fed to the nozzle. A sight port 68 is provided as shown.

Thus, depending upon whether tangential entry or axial entry is used for the combustion chamber, the emergent gases consisting of molybdic trioxide vapor, oxides of carbon ($CO_2$) and certain volatile metal oxides (e.g., molybdates of lead, etc.) are separated from the gangue components of silica, clays, and non-volatile metal oxides (e.g., $Fe_2O_3$) The spinning action in the presence of the high-temperature gas phase causes coalescence and agglomeration of the fine gangue particles which are caused to move under the influence of centrifugal forces to the refractory lining of the chamber and are removed as a liquid phase. The slags so formed flows by gravity down the walls to the bottom of the furnace into a slag pot. By operating at a sufficiently high temperature (e.g. 1700° C.), the volatility of molybdenum trioxide is sufficiently high so that the collected slags generally contain less than 5 percent by weight molybdenum and a total of less than 1 percent of the molybdenum fed. The residence time in the burner chamber and the turbulence in the burner itself combined with the particle size of the feed should be controlled to assure substantially complete conversion to the volatile trioxide. The centrifugal flow should be controlled to minimize erosion of the furnace lining.

The furnace compartment may be operated at a draft of approximately 12 inches of water which is controlled by a draft fan located downstream in the circuit, generally at the baghouse. The vapors from the furnace are passed through a downstream partial condenser, e.g. 64, operating at temperatures ranging from 850° to 950° C. This partial condenser serves to remove lead, copper, zinc, and other basic and amphoteric metal oxide compounds which form liquid molybdates. This partial condenser is operated at a temperature above the condensation or desublimation temperature of molybdic trioxide but below the temperatures at which the metal molybdates exert a significant vapor pressure. The partial condenser may consist of two tortuous-path brick-work chambers which are operated in parallel. While one is being utilized in the circuit, the other is flushed with high temperature flue gases to volatilize and collect the heavy metal impurities in a secondary collection system. As stated above, temperature control of the on-stream partial condenser can be obtained by the aspiration of finely dispersed water sprays directed from the walls, or via other forms of heat exchange.

Figure 5:
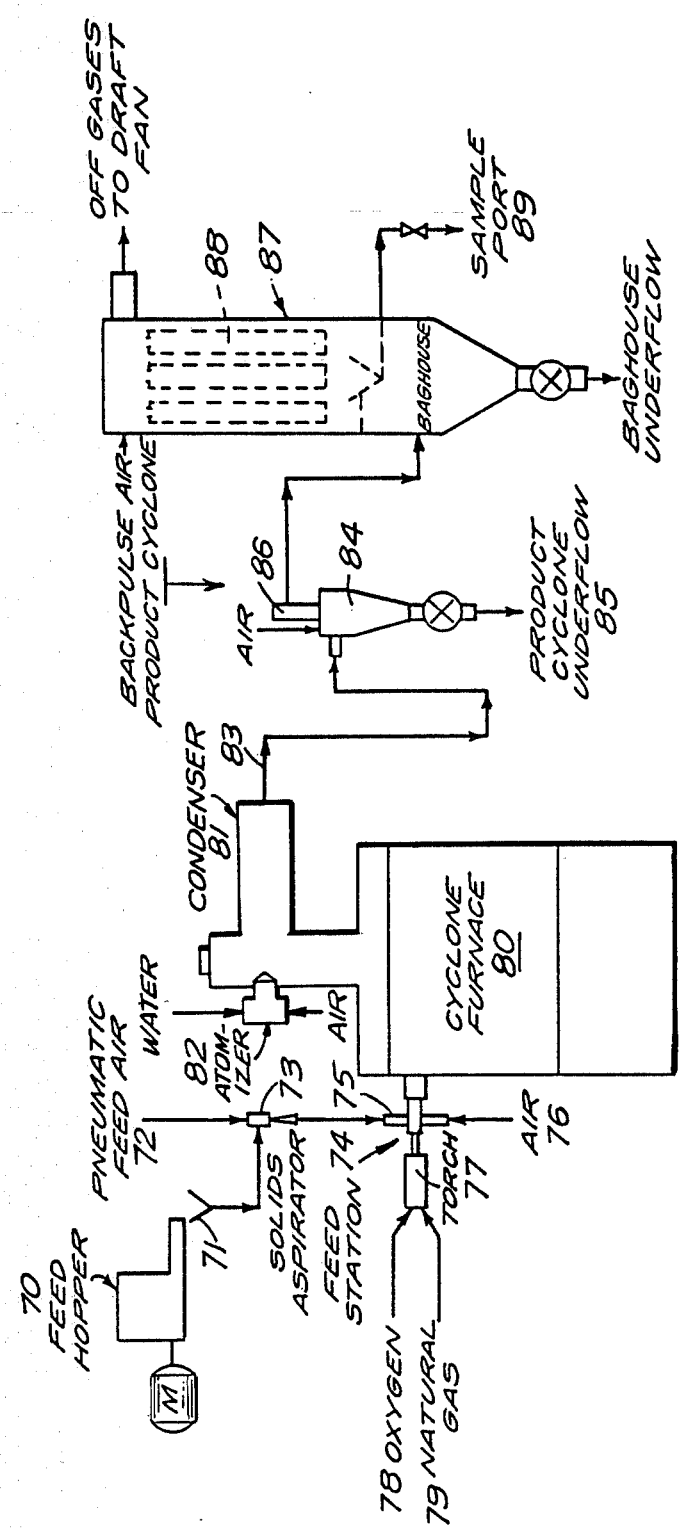
FIG. 5 is a schematic in the form of a flow sheet showing the various elements of the apparatus employed in carrying out the invention.

If the heavy metal impurities of the feed concentrate are sufficiently low and the product quality specifications permit, then the partial condenser can be by-passed. Subsequently, the flue gases enter a total condenser for molybdic trioxide (FIG. 5). In this condenser, additional finely dispersed water sprays may be employed to impinge downstream to the flow of gases, thereby dropping the temperature to the range of 500° to 550° C. This temperature is well below that for the desublimation of the molybdic oxide to produce a solid phase of very low vapor pressure. The effluent gas which now consists of flue gases containing water vapor, some excess oxygen, and oxides of carbon in a predominantly nitrogen stream is directed to a gas cyclone. The cyclone is operated below 500° C. and is the primary product collector for the condensed solids. The product is continuously collected into a sealed bin and removed via a star valve or other sealing device to a densifier which is vented to the primary flue gas stream. The entry portion of the baghouse maintained at about 250° C. may be used as the primary condenser for molybdenum trioxide.

The cyclone overflow is cooled by further water injection or heat exchange to a flue system of electrostatic precipitators and baghouse where the finer particles of sublimated product are removed.

The lowering of the temperature between furnace and baghouse may be optionally achieved by heat exchange or by vaporization of water. In the former instance, some of the heat can be used either to preheat the combustion air to the burner or for other process heat requirements. The flue gases can be discarded to the atmosphere.

The aforementioned processing steps will be clearly apparent from the flow sheet of FIG. 5 which depicts a motor-driven feed hopper 70 which feeds the material to be sublimed to a collecting zone 71 from which the material is aspirated via aspirator 73 which is actuated by means of pneumatic feed air 72, whereby the particulate solids of molybdic oxide are pneumatically suspended and conducted to cyclone furnace feed station 74 comprising solids inlet port 75 and air inlet port 76. The mixture is fed to the furnace coaxially along the torch axis, the torch 77 having fed to it oxygen (or oxygen enriched air) 78 and natural gas 79.

The cyclone furnace 80 is shown schematically, the fuel gas, oxygen and the pneumatically suspended material being fed in spinning fashion as described for FIG. 3, the products of reaction being drawn off through condenser 81.

The effluent 83 leaving the condenser is conducted to cyclone 84, the temperature of which is below the sublimation temperature of molybdenum oxide. The condensed molybdenum trioxide is removed as a product underflow 85, while the gases with some entrained solids are drawn off the top 86 of the condenser and sent to baghouse 87 containing electrostatic precipitators 88 where the finer particles of the sublimated product are removed. The baghouse product represents less than 10% of the feed.

The off-gases containing water, nitrogen, excess oxygen and carbon oxides are drawn off via a draft fan. As will be noted, the baghouse is provided with a sample port 89 for removing samples for analysis.

Figure 6:
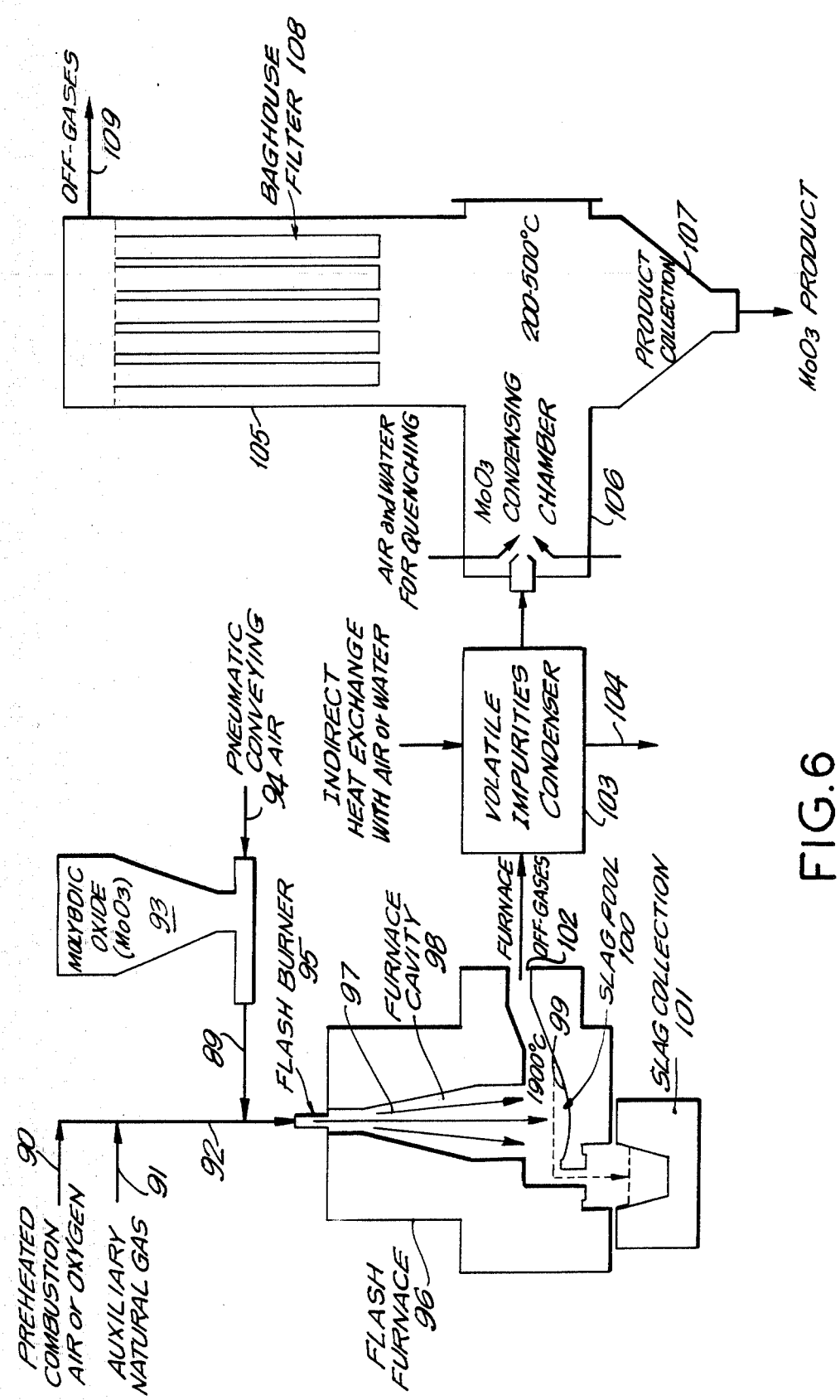
FIG. 6 is a further embodiment of the invention in which a flash furnace utilizes a slag pool towards which a hot stream of molybdic oxide vapor is directed downward to minimize direct contact with the wall of the furnace.

A preferred system for carrying out the process of the invention is that depicted in FIG. 6. This system further minimizes the erosion problem of the cyclone furnace by employing a furnace chamber which is vertically disposed as in the cyclone furnace except that a hearth is provided at the lower portion thereof for containing a slag pool against which the flame with the reaction products is directed.

Thus, the slag-forming solids in the flame enter the slag pool while the off-gases and the $MoO_3$ vapors are drawn off and passed through a condenser to remove condensable impurities, the volatile molybdenum trioxide being then passed to the baghouse where the vapors are condensed and separated from the off-gases.

The system shown schematically in FIG. 6 depicts preheated combustion air or oxygen 90 (500° C.) and natural gas 91 being fed to line 92 to which is also being fed impure molybdic oxide ($MoO_3$) 93 suspended pneumatically in air via means 94, the mixed stream entering flash burner 95 of flash furnace 96.

The stream is heated via the ignition of the natural gas to provide a flame 97 in furnace cavity 98, the flame being directed against hearth 99 containing slag pool 100. The slag pool accumulates during flash sublimation by virtue of the slag-forming constituents present in the impure molybdic oxide ($MoO_3$), the slag overflowing into collector 101.

The molybdic oxide is sublimed in the furnace at about 1700° C. The off-gases and the vapors of $MoO_3$ leave the furnace at 102 and pass through condenser 103 maintained at about 800° C., whereby high melting impurities are condensed and removed at 104 and the vapors of $MoO_3$ passed to baghouse 105.

The baghouse has a condensing chamber 106 for receiving $MoO_3$ vapors which are cooled and condensed (200° C. to 500° C.), the condensed oxide accumulating in product collector 107, with the off-gases passing through baghouse filter 108 and thence to through outlet line 109.

This system is advantageous over the cyclone furnace in that the furnace walls are not impinged upon directly by the flame and thus are protected against accelerated corrosion.

EXPERIMENTAL RESULTS

As illustrative of the invention, experimental tests were conducted in which technical grade molybdenum trioxide was subjected to flash sublimation at a feed rate of about 50 to 60 grams per minute at about 1700° C. to 1750° C. under steady state conditions. The molybdenum trioxide prior to sublimation had the following composition:

TABLE 1

| Element | Feed ppm | % of Composition |
|---|---|---|
| Si | 33,100 | 3.31 |
| Fe | 8,890 | 0.89 |
| Al | 3,570 | 0.36 |
| Cu | 960 | 0.096 |
| K | 2,150 | 0.22 |
| Pb | 670 | 0.067 |

The balance of the feed material is molybdenum trioxide.

In all the experiments using technical-grade oxide as feed, a slag was produced that had sufficient fluidity to flow from the zone of flame impact and not interfere with the desired gas flow pattern in the furnace cavity. However, auxiliary heat had to be provided near the slag removal port to assure continuous slag discharge.

Three test were conducted referred to as Test A, Test B and Test C, respectively. In Test A, a vortex finder (note 54 of FIG. 4) was not used and baffling means was employed immediately downstream from the furnace cavity.

In Test B, the vortex finder was used as in FIG. 4 and all collection devices, such as baffling means and ceramic packing, were removed. In Test C, the burner flame was directed downward in a slag pool as in FIG. 6 and the off-gases leaving the furnace cavity were passed through an indirectly-cooled condenser. As a result of the three different modes of operation, the following MoO$_3$ products were obtained having the stated compositions.

TABLE 2

| | | (Test A) | |
| Element | Feed ppm | Test A ppm | % Average Reduction of Element |
|---|---|---|---|
| Si | 33,100 | 300-400 | 98.5 |
| Fe | 8,890 | 300-500 | 95.5 |
| Al | 3,570 | 150-200 | 95.2 |
| Cu | 960 | 300-400 | 60.8 |
| K | 2,150 | 1300-1600 | 32.5 |
| Pb | 670 | 500-750 | 6.7 |

TABLE 3

| | | (Test B) | |
| Element | Feed ppm | Test B ppm | % Average Reduction of Element |
|---|---|---|---|
| Si | 33,100 | 900-1100 | 97. |
| Fe | 8,890 | 1600-1900 | 80.5 |
| Al | 3,570 | 500-800 | 81.8 |
| Cu | 960 | 550-650 | 37.5 |
| K | 2,150 | 1550-1800 | 22.1 |
| Pb | 670 | 550-750 | 3. |

TABLE 4

| | | (Test C) | |
| Element | Feed ppm | Test B ppm | % Average Reduction of Element |
|---|---|---|---|
| Si | 33,100 | 500-800 | 98. |
| Fe | 8,890 | 1100-1600 | 84.8 |
| Al | 3,570 | 300-450 | 89.5 |
| Cu | 960 | 450-550 | 47.9 |
| K | 2,150 | 1450-1700 | 26.7 |
| Pb | 670 | 550-700 | 6.7 |

While each of the six elements monitored in each of the tests did not meet the desired specification for the elements, it will be noted that substantially high reductions were obtained for the elements Si, Fe and Al in Tests A (using baffle means) and C (using a slag pool). A desired specification for silicon is 140 ppm. Silicon removal was over 95% in each of the tests. However, very little upgrading occurred with respect to Cu, K and Pb.

As regards Si, Fe and Al, the tests indicate that these elements are not volatilized to any significant extent and are lowered substantially using baffle means as in Test C. The experimental results also indicate that Cu, K and Pb are transported from the furnace cavity or chamber as vapors.

The advantage of using the furnace with a slag pool for absorbing high melting materials is that erosion of the furnace lining is minimized, whereas in the case of Test A, the furnace lining has a greater tendency to erode because of flame contact. Refractory wear of some severity has been experienced in three parts of the furnace cavity: (a) at the vortex finder, (b) at the walls or lining of the flame channel, and (c) at the area of flame impact.

In the furnace embodiment of FIG. 6, the furnace has its cavity or chamber 96 expanding conically towards slag pool 100 such that the side walls or lining are not impacted to any large degree, the flame being directed so as to impact fully on the slag pool which absorbs the heat and the solids including the slag-forming constituents suspended in the flame.

In a test of 100 hours of continuous running using a flash sublimation system of the type disclosed in FIG. 1, the following observations were made:
1. Less than 1% by weight of the molybdenum fed to the system was lost to the slag.
2. Over 97% by weight of the silicon in the molybdic oxide was retained in the discharge slag, although the experimental accountability of silicon calculated to 101%.
3. Iron and aluminum reported predominantly in the discharge slag. About 80% of the Fe was retained in the slag. The aluminum in the slag was higher than expected due to refractory wear.
4. Some of the volatile elements (lead and potassium) were retained in the slag.
5. The high temperature condenser was not very effective for removing the volatile impurities Pb, K and Cu.

While a specific product specification was not achieved, the recovery of a markedly upgraded molybdenum product was an important positive factor in the successful application of the process provided by the invention.

As illustrative of another embodiment of the invention, the following example is given:

EXAMPLE

Molybdic oxide containing slag-forming constituents is employed having a particle size of less than 10 mesh (U.S. Standard). The oxide which is free flowing is fed pneumatically at feed end portion 13 (FIG. 1) where it is aspirated into the system at a pressure of about 75 lbs/in$^2$ and a flow rate of about 200 grams per minute. The solids material in the suspended form is fed to the inlet port of the cyclone furnace 21 coaxial with burner assembly 10 to which oxygen and natural gas are fed, the oxygen pressure being about 40 lbs/in$^2$ and natural gas at 20 lbs/in$^2$, the ratio of oxygen to fuel gas being adjusted to provide a temperature within the cyclone following ignition of about 1600° C.±200° C. (The ratio is stoichiometric and is determined by fuel gas analysis and flame appearance).

Following reaction in the cyclone furnace, the gaseous products, including sublimed molybdenum trioxide, are drawn off via a draft fan capable of operating at a flow rate of about 100 SCFM, the gaseous products and entrained solids being drawn into partial condenser 34 maintained at a temperature of about 850° C. to 950° C. This temperature is below the volatilization temperature of metal oxide impurities and molybdates but above the sublimation temperature of molybdenum trioxide. The gases and vapors leaving the condenser are substantially decreased in metal oxides and molybdates, and then passed to the lower portion of baghouse 36 where the vapors of MoO$_3$ are condensed via the quenching effect of air injected through nozzle 37. The temperature of the condenser portion of the baghouse is 150° C. to 450° C. at which the molybdenum trioxide vapors condense and separate from the off-gases.

The product is removed as underflow via nozzle 38 and has a contained MoO$_3$ analysis of about 99.95%.

The off-gases which comprise 66% by volume of N$_2$, 12% by volume of CO$_2$, excess oxygen and moisture making up the balance of about 24% are passed upwardly in baghouse 36 where entrained solids are removed. A materials balance indicates that about 99.6% of the original molybdenum is recovered as MoO$_3$.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for flash-sublimation of molybdic oxide containing slag-forming constituents which comprises, feeding a pneumatically suspended stream of particulate molybdic oxide and a mixture of fuel and oxidizing gases through a nozzle into a confined furnace chamber, said fuel gas-oxidizing gas mixture exiting from said nozzle being ignited to provide a flame thereof, maintaining said flame at a condition to provide a temperature in the range of 1600° C.±200° C. to about 1800° C. in said furnace chamber sufficient to sublime said molybdic oxide, and to melt slag-forming constituents in said molybdic oxide collecting liquid slag formed in said furnace chamber, causing the resulting gases and any suspended solids including the sublimed molybdenum trioxide to flow from said furnace chamber to and through a condensing chamber, the temperature of said condensing chamber being controlled to above the condensing temperature of said sublimed molybdenum trioxide but below the volatilization temperature of volatile metal-containing impurities present and thereby effect a separation of the molybdenum trioxide from said impurities, and then condensing and recovering the separated molybdenum trioxide as solids while separating off-gases therefrom.

2. The process of claim 1, wherein the temperature in the condensing chamber immediately following reaction in the furnace chamber ranges from about 850° C. to 950° C.

3. The process of claim 2, wherein the temperature in the chamber for collecting and condensing molybdenum trioxide ranges from about 150° C. to 500° C.

4. The process of claim 1, wherein the pneumatically suspended stream is fed through the nozzle into a cylindrically shaped cyclone furnace such as to apply a spinning action to the stream and cause the gangue particles to melt and deposit on the cylindrical wall of the furnace and flow down by gravity to the bottom thereof.

5. A process for the flash-vaporization molybdic oxide containing slag-forming consituents which comprises, feeding a pneumatically suspended stream of particulate molybdic oxide and a mixture of fuel and oxidizing gases through a nozzle into a confined furnace chamber having a hearth for supporting a slag pool, said fuel gas-oxidizing gas mixture exiting from said nozzle being ignited to provide a flame thereof, directing said flame towards the hearth and maintaining said flame at a condition to provide a temperature in said furnace in the range of 1600° C.±200° C. to about 1800° C. to sublime said molybdic oxide, the temperature being at least sufficient to melt said slag-forming constituents and cause the slag formed to collect as a pool in the hearth, causing the resulting gases including the volatile molybdenum trioxide to flow from said furnace to a partial condensing chamber, the temperature of said condensing chamber being controlled to above the condensing temperature of said said sublimed molybdenum trioxide but below the volatilization temperature of metal oxide impurities present such as to effect a separation of the molybdenum trioxide from said impurities, and passing the separated sublimed molybdenum trioxide to a condenser maintained at a temperature of about 150° C. to 500° C. to condense and recover said trioxide as solids and separate it from off-gases comprises of oxides of carbon, N$_2$, H$_2$O and excess O$_2$.

6. The process of claim 5, wherein the temperature in the condensing chamber immediately following reaction in the furnace chamber ranges from about 850° C. to 950° C.

* * * * *